July 18, 1950  A. PARRY  2,515,732
EDGING ATTACHMENT FOR POWER LAWN MOWERS
Filed July 9, 1948  2 Sheets-Sheet 1

INVENTOR.
ARTHUR PARRY
BY
McMorrow, Berman & Davidson
ATTORNEYS

July 18, 1950   A. PARRY   2,515,732
EDGING ATTACHMENT FOR POWER LAWN MOWERS
Filed July 9, 1948   2 Sheets-Sheet 2

INVENTOR.
ARTHUR PARRY
BY
McMorrow, Berman & Davidson
ATTORNEYS

Patented July 18, 1950

2,515,732

UNITED STATES PATENT OFFICE 2,515,732

EDGING ATTACHMENT FOR POWER LAWN MOWERS

Arthur Parry, Retsil, Wash.

Application July 9, 1948, Serial No. 37,893

1 Claim. (Cl. 56—295)

This invention relates to power lawn mowers, and more particularly to an attachment for use with power mowers for cutting grass close to walls or other obstructions.

A main object of the invention is to provide a novel and improved lawn edging attachment for power mowers which is simple in construction, easy to install and which is effective to cut grass close to walls, fences, or other obstructions otherwise not approachable by the main cutter blades of the mower.

A further object of the invention is to provide an approved power lawn mower edging attachment which is efficient in operation, inexpensive to manufacture, sturdy in construction, and which is driven from the power shaft of the mower.

Further objects and advantages of the invention will become apparent from the following description and claims, and from the accompanying drawings, wherein:

Figure 1:
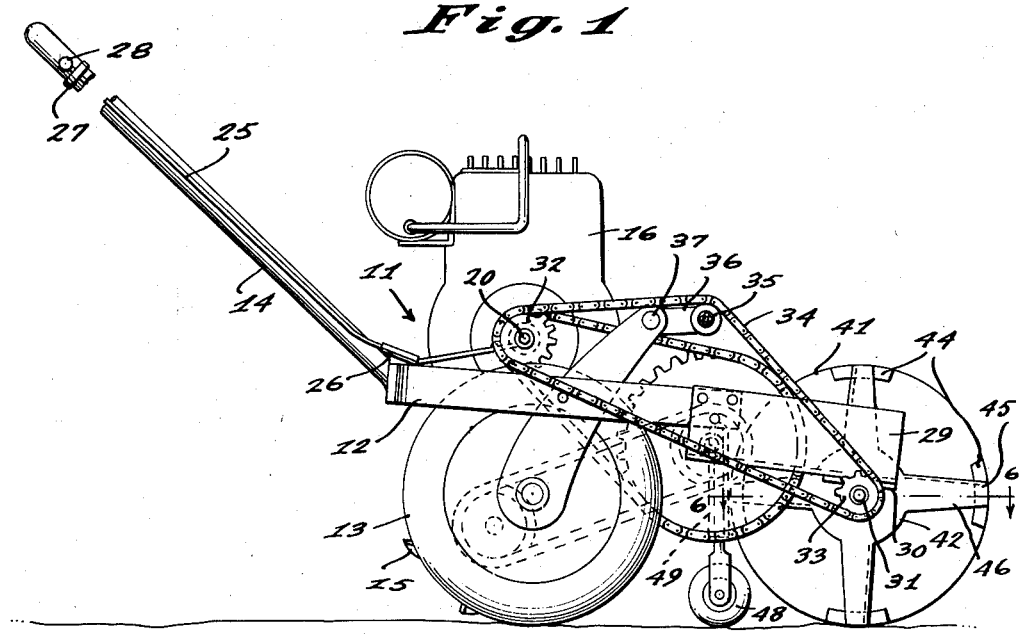
Figure 1 is a side elevational view of a power lawn mower provided with an edging attachment constructed in accordance with the present invention.
Figure 2:
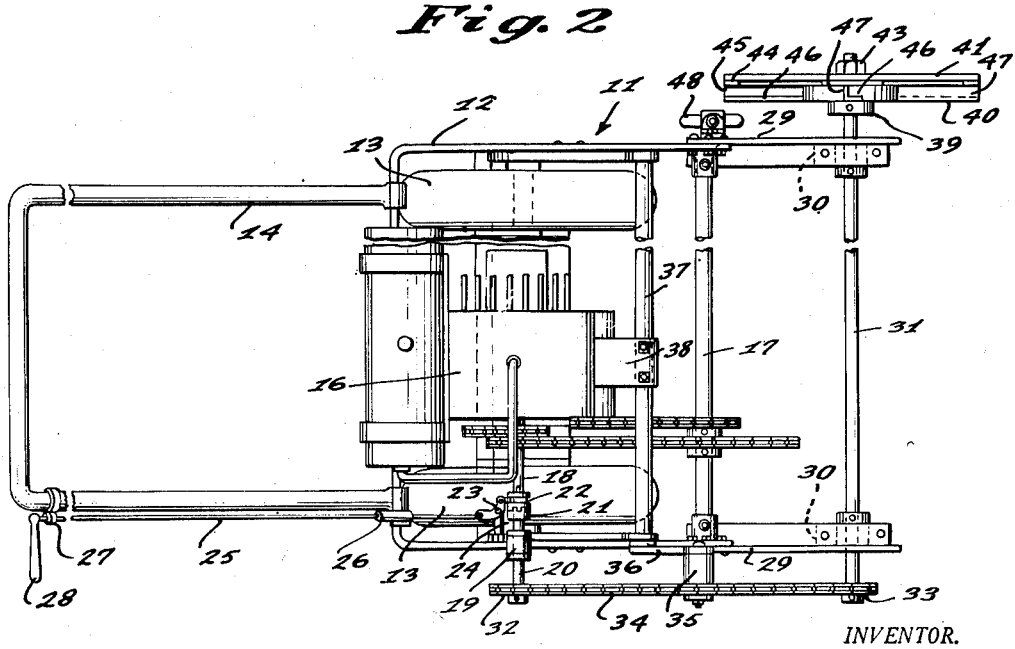
Figure 2 is a fragmentary top plan view of the lawn mower of Figure 1.

Referring to the drawings, 11 designates generally a power lawn mower having the usual frame 12 supported on ground-engaging wheels 13, 13 and provided with the inclined U-shaped push bar structure 14 secured to the rear end of frame 12 and extending upwardly and rearwardly therefrom. Designated at 15 is the cutting rotor which is driven in a conventional manner by a gasoline engine 16 mounted on frame 11 through a transverse countershaft 17 rotatably mounted at the forward end of frame 12. The engine shaft is shown at 18.

Rotatably supported in an upwardly extending bearing bracket 19 secured to frame 12 is a short transverse shaft 20 axially aligned with motor shaft 18 and provided at its inner end with a toothed clutch disc 21. Splined on shaft 18 is an opposing toothed clutch disc 22. Engaged in an annular groove in clutch disc 22 is one end of a bent lever 23 pivoted to a projection 24 carried by bracket 19. Connected to the other end of lever 23 is a control rod 25 slidably supported in guide brackets 26 and 27 secured to one arm of the push bar 14 and provided at its end with a handle 28. When handle 28 is pushed forward clutch disc 22 is disengaged from clutch disc 21. When handle 28 is moved rearwardly clutch disc 22 is interlocked with clutch disc 21 to couple shaft 20 to the motor shaft 18.

Designated at 29, 29 are forwardly extending angled bracket members secured to the respective forward ends of frame 12 at each side of said frame. Secured to the underside of the bottom flange of each bracket member 29 is a bearing bracket 30 and journalled in the bearing brackets 30 is a transverse shaft 31. The shafts 20 and 31 carry respective sprocket wheels 32 and 33 which are coupled by a sprocket chain 34. Chain 34 is kept taut by a roller 35 carried on an arm 36, said arm being secured to a transverse bar member 37 fastened to the motor housing by a bracket 38.

Shaft 31 projects laterally of the mower at one side thereof and has secured thereto a collar 39. Mounted on the shaft outwardly adjacent said collar is the cutting rotor 40. Also mounted on the shaft is a guard disc 41, the cutting rotor being provided with a thickened hub portion 42 against which the guard disc 41 is clamped by a nut 43 threaded on the end of shaft 31. The nut 43 tightly clamps the disc 41 and hub 42 against the collar 39, making these parts substantially rigid with shaft 31. Guard disc 41 is reinforced by a plurality of arcuate tabs 44 welded to its inside surface adjacent its periphery.

Rotor 40 comprises the hub 42 and a plurality of radial cutting blades 45 secured to said hub, each blade being right angular in cross section. One leg of each blade constitutes a cutting portion 46 extending in a plane transverse to shaft 31 and the other leg a deflector portion 47 extending in a plane substantially at right angles to the cutting portion 46.

When the clutch discs 21 and 22 are interengaged, chain 34 drives shaft 31, causing the rotor 40 and guard disc 41 to rotate. Grass is cut by the rotating vertical cutter portions 46 of the rotor and the grass cuttings are ejected outwardly of the cutting rotor 40 by the vane portions 47 of said rotor.

A supporting caster 48 is provided rearwardly adjacent the rotary cutter, said cutter being mounted in a bracket 49 secured to and depending from the adjacent angle bar 29. The caster preferably is of the spring cushioned type and the bracket 49 is adjustable with respect to the angle bar 29 so that the height of the rotary cutter above the ground may be varied as required.

Figure 3:
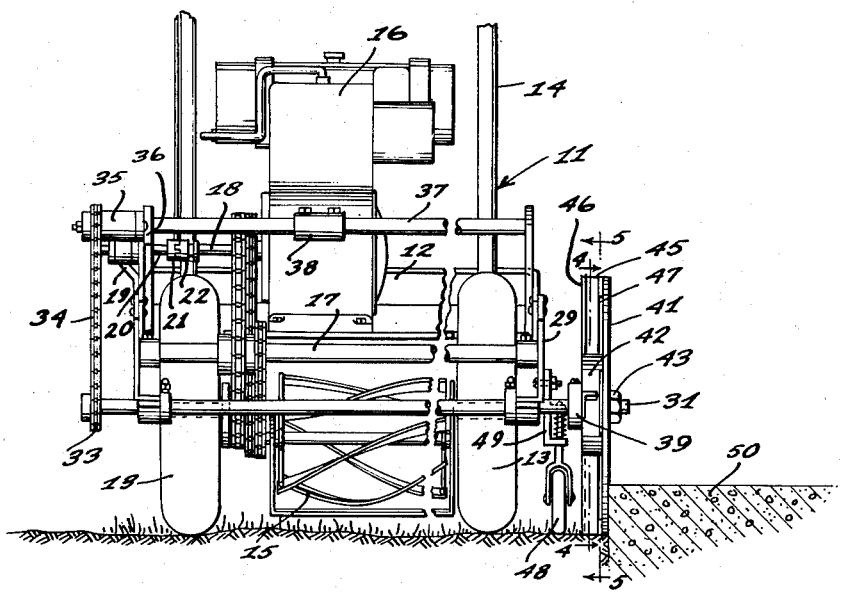
Figure 3 is a fragmentary front elevational view of the lawn mower of Figure 1.
Figure 4:
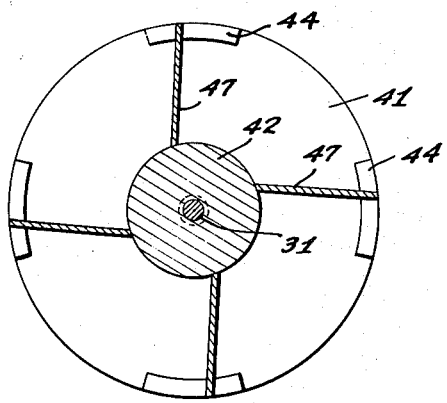
Figure 4 is an enlarged cross-sectional detail view taken on line 4—4 of Figure 3.
Figure 5:
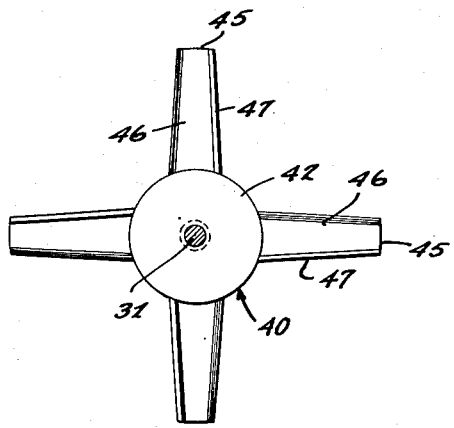
Figure 5 is an enlarged cross-sectional detail view taken on line 5—5 of Figure 3.
Figure 6:
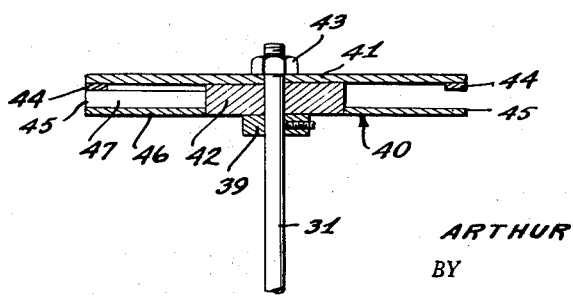
Figure 6 is an enlarged cross-sectional detail view taken on line 6—6 of Figure 1.

As shown in Figure 3, the edge of a lawn adjacent to a curb or other obstruction shown at 50, may be cut by moving the mower parallel to the obstruction with the guard disc 41 adjacent the curb.

While a specific embodiment of an edging attachment for power lawn mowers has been disclosed in the foregoing description it will be understood that various modifications within the spirit of the invention may occur to those skilled in the art. Therefore it is intended that no limitations be placed on the invention except as defined by the scope of the appended claim.

What is claimed is:

A vertically disposed edging cutter for lawn mowers and the like, comprising a horizontal rotatable support, an axially thin flat hub secured to the rotatable support, said hub having inner and outer vertically arranged sides, said rotatable support extending axially outwardly of the outer vertical side of the hub, a plurality of elongated radially extending cutters secured to the periphery of the hub and being spaced equidistantly circumferentially, said cutters being L-shaped in transverse cross section, and including inner flat cutting blades arranged adjacent to the inner vertical side of the hub and lying substantially in the plane of such inner vertical side, said cutters including elongated flat radially extending narrow deflector vanes integrally secured to the cutting blades adjacent to one longitudinal edge of the cutting blades and extending for substantially the entire length of the cutting blades between the periphery of the hub and the outer ends of the cutting blades, said deflector vanes being arranged substantially perpendicular to the cutting blades and to the inner and outer vertical sides of the hub and extending axially outwardly of the outer sides of the cutting blades and having their outer longitudinal edges arranged substantially adjacent to the outer vertical side of the hub, and a flat circular guard disc secured to said rotatable support adjacent to and in contacting relation with the outer vertical side of the hub, said guard disc substantially completely covering the outer sides of the radial cutters and being disposed close to the outer longitudinal edges of said deflector veins, whereby the entire edging cutter is axially thin and flat.

ARTHUR PARRY.

REFERENCES CITED

The following references are of record in the file of this patent:

UNITED STATES PATENTS

| Number | Name | Date |
| --- | --- | --- |
| 1,336,257 | Muzzy | Apr. 6, 1920 |
| 2,185,659 | Chernow | Jan. 2, 1940 |
| 2,263,431 | White | Nov. 18, 1941 |